United States Patent Office 3,347,118
Patented Oct. 17, 1967

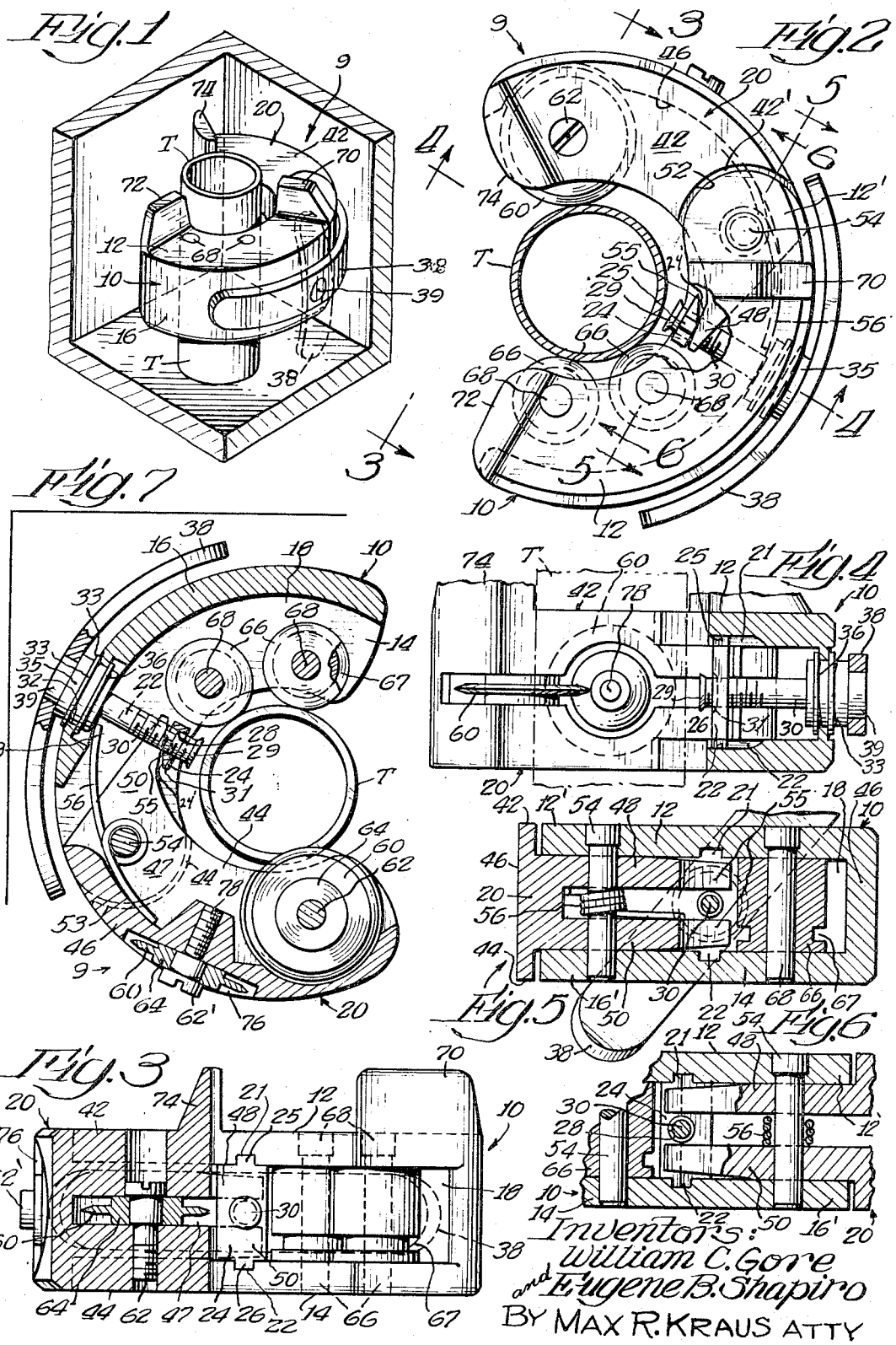

3,347,118
TUBE CUTTER
William C. Gore, Streamwood, and Eugene B. Shapiro, Highland Park, Ill., assignors to Chicago Specialty Manufacturing Co., Skokie, Ill., a corporation of Illinois
Filed Feb. 23, 1966, Ser. No. 529,507
12 Claims. (Cl. 82—75)

This invention relates to tube cutters.

One of the objects of this invention is to provide a tube cutter which may be operated in a confined area where present day commercial tube cutters could not so operate.

Another object of this invention is to provide a tube cutter of generally circular shape which will permit it to engage the tube to be cut and be rotated thereabout in a confined area where the distance between the tube and the adjacent wall area is minimal.

Another object of this invention is to provide a tube cutter comprising a pair of segments forming a generally C-shaped configuration in plan, with one of the segments pivotally mounted with respect to the other segment and with the cutter blade supported on the pivotal segment, and wherein the movement of the pivotal segment is controlled by a manually rotatable member mounted on the other segment, said manually rotatable member having an arc substantially that of the arc of the other segment.

By virtue of the shape and construction of the tube cutter of this invention it is possible to cut a one inch O.D. tube which is positioned about an inch of a wall or a pair of walls or obstruction and about ¾ of an inch from a floor. The circular shape of the device and the arc-shaped manually rotatable member permits the device to be rotated around the tube and perform the cutting operation in the minimal space. This is not attainable by present day tube cutters now on the market.

Other objects will become apparent as this description progresses.

In the drawings:

FIGURE 1 is a perspective view showing the tube cutter in relation to a tube to be cut in close quarters.

FIGURE 2 is a top plan view of the tube cutter in relation to a tube to be cut.

FIGURE 3 is a view taken on line 3—3 of FIGURE 2.

FIGURE 4 is a view partly in section taken on line 4—4 of FIGURE 2.

FIGURE 5 is a sectional view taken on line 5—5 of FIGURE 2.

FIGURE 6 is a sectional view taken on line 6—6 of FIGURE 2, and

FIGURE 7 is a top plan view with the top portion removed.

The tube cutter forming this invention and generally indicated at 9 comprises a first segment or body generally indicated at 10 which is of generally arcuate shape in plan and which has a top wall 12, a spaced bottom wall 14 and a connecting side wall 16 defining a channel space or recess 18. The inner ends of the top and bottom walls extend beyond the connecting side wall 16 and are rounded as at 12' and 14' and in effect form ears for receiving therebeween the fingers of the second segment generally indicated at 20, as best shown in FIG. 5. The top and bottom walls 12 and 14 of the first segment 10 each have on the inside thereof a groove 21 and 22 respectively, which grooves are alined for the purpose of guiding the actuating member 24 which moves the second segment 20 pivotally with respect to the first member 10, as will be described.

The actuating member 24 has an upward extension 25 and a downward extension 26 which respectively engage the grooves 21 and 22 to ride therewithin. The actuating member 24 has a camming surface 24'. It also has an internally threaded opening 28 to receive a screw member 30. The inner end of screw member 30 is enlarged or peened as at 29 to ride within a recess 31 in actuating member 24.

Screw member 30 has an integrally formed grooved washer 33 and is fixedly secured at its outer end to the manually engageable member 38. The side wall 16 of the first segment 10 has an opening 32 which accommodates the screw member 30 and grooved washer 33. The screw member 30 and the grooved washer 33 are inserted into opening 32 from the outside. A retaining ring 36 is inserted from the inside of the side wall 16 and engages the groove in the grooved washer 33 to hold the screw member 30 and the manually engageable member 38 in a captive rotatable position.

The manually engageable member 38 is generally of arcuate shape and has the same arc as the side wall 16 and is positioned parallel thereto but spaced therefrom. The screw member 30 is rotated by rotation of the manually engageable member 38. Rotation of the screw member will not move the screw member 30 axially but will move the actuating member 24 axially forwardly or rearwardly on the screw member within the grooves 21 and 22 and thereby actuate the pivotal segment 20 to pivot in relation to the first segment 10.

The pivotal segment 20 is generally of arcuate shape in plan and has a top wall 42 and a spaced bottom wall 44 connected by a side wall 46 which provides a channel space or slot 47 between the top and bottom walls. The inner ends of the top and bottom walls 42 and 44 are recessed and form in effect a pair of spaced fingers 48 and 50 which are continuations of the top and bottom walls 42 and 44. The inner ends of the top and bottom walls adjacent the fingers are curved or arcuate as at 52 and 53 respectively. The shape of the fingers 48 and 50 are identical. The lower finger 50 is best shown in FIG. 7. The fingers are provided with an inner camming surface 55 which, as best shown in FIG. 7, engage the actuating member 24. The fingers 48 and 50 of pivotal segment 20 are positioned inside and between the spaced ears 12 and 14 of the first segment 10 and a pivot stud 54 passes through the alined openings in the fingers and ears to pivotally secure the pivotal segment 20 to the first segment 10.

As best seen in FIG. 7, the camming surface 24' of the actuating member 24 engages the cammed surfaces 55 of the fingers 48 and 50 so that axial movement of the actuating member 24 on the screw member 30 will cause a pivoting of the pivotal member 20. A tension spring 56 surrounds the pivot stud 54 within the channel space or slot 47, with one end 57 of the spring bearing against the side wall 46 of the pivotal segment 20 and the opposite end 58 of the spring bearing against the side wall 16 of the first segment 10. The torsion spring 56 thus normally will urge the pivotal segment 20 to a pivoted position outwardly or away from the first segment 10, and only by the rotation of the screw member 30 through rotation of the rotating member 38 will be pivotal segment 20 be caused to pivot inwardly. The spring 56 thus acts to pivot the pivotal member 20 outwardly, with the actuating member 24 acting to position the pivotal segment either pivotally inwardly or outwardly with respect to the first segment 10.

A circular cutter or blade generally indicated at 60 is rotatably supported on a threaded vertical pin 62 which is supported in and connected to the threaded alined openings in the top and bottom walls 42 and 44 of pivotal segment 20. The blade 60 is supported and rotates within the channel space or slot 47 in the pivotal segment 20 and the edge of the blade extends inwardly of the inner side of said segment for engagement with a tube T for cutting same. The hub of the blade 60 has bossings 64 on the opposite sides thereof.

The first segment 10 carries a pair of spaced rollers 66. The rollers are supported in the channel space 18 of the first segment by studs 68 anchored in alined openings in the top and bottom walls of the first segment. The rollers are adjacent actuating member 24 and extend inwardly beyond the inner walls of segment 10 to engage the tube T. The rollers each have an annular groove 67 adjacent the bottom thereof.

The top wall 12 of the first segment 10 has a pair of upwardly extending tabs 70 and 72 and the pivotal member 20 has an upwardly extending tab 74. The tabs are provided for the purpose of manual engagement so that the tube cutter 9 may be manually rotated after it is on tube T, or a screw driver or spanner wrench or other tool may be inserted to extend between or upon the tabs individually or collectively to facilitate rotation of the cutter.

The cutter is constructed to carry a spare cutter blade and a spare pin or special screw on which the cutter blade rotates. The side wall 46 of the pivotal segment 20 has an annular recess 76 to accommodate the spare cutter blade 60' which is supported on a spare pin 62' which is in threaded engagement with the threaded opening 78.

As best seen in FIGS. 1, 2 and 7, the device in plan is generally C-shaped and the rotating manually engageable member 38 has the same arc as the arc of the first segment 10 but is spaced therefrom so that it may be rotated on the axis of the screw member 30 in a confined area. The manually engageable member 38 is spaced from but extends parallel to the side wall of the first segment and is in close proximity to the first segment 10. It therefore does not appreciably increase the dimensions of the device and permits the cutter to be used on a tube T in an area which is about one inch from walls W. The cutter is positioned on a tube, as shown in FIG. 1, and by rotating the manual engageable member 38 the pivotal segment 20 is pivotally adjusted to bring it closer to the tube and thereby cause the cutting blade 60 to cut into the tube. The cutter is then manually rotated about the tube to perform the cutting action on the tube.

It will be understood that various changes and modifications may be made from the foregoing without departing from the spirit and scope of the appended claims.

What is claimed is:

1. A tube cutter comprising a first segment and a second segment with said second segment pivotally connected to the first segment and with both said segments surrounding a portion of the circumference of the tube to be cut, a cutting blade supported on one of said segments, and means supported on one of said segments and engaging the other segment for pivotally moving said pivotal segment in relation to the first segment.

2. A structure as defined in claim 1 wherein said segments are each of an arcuate shape.

3. A structure as defined in claim 1 wherein at least one of said segments has an arc.

4. A structure as defined in claim 1 wherein the pair of segments form a generally C-shaped configuration in plan.

5. A structure as defined in claim 1 in which the segments form a generally C-shaped configuration in plan and in which the means for pivotally moving the pivotal segment includes a manually rotatable member having an arc substantially that of the segment on which it is positioned.

6. A structure as defined in claim 1 in which the first and second segments form a generally circular shape.

7. A structure as defined in claim 4 which includes spring means for normally urging the second pivotal segment to pivot outwardly with respect to the first segment and wherein the means for pivotally moving the pivotal segment includes a threaded member which is supported for rotational movement.

8. A structure as defined in claim 7 in which the threaded member is fixedly secured to a manually rotatable member and in which the manually rotatable member is positioned parallel to the side of one of said segments and in which the rotatable member is of arcuate shape.

9. A structure as defined in claim 8 in which the threaded member supports a member movable axially on said threaded member and in which said last mentioned member engages the pivotal segment for pivoting same.

10. A structure as defined in claim 9 in which the member movable axially has a camming surface.

11. A structure as defined in claim 4 in which the segments have upwardly extending tabs.

12. A structure as defined in claim 1 designed to work in extremely close quarters and to cut tubing having approximately one inch O.D. and positioned approximately one inch from a wall or obstruction and about ¾ of an inch from a floor or the like.

References Cited

UNITED STATES PATENTS 1,583,317  5/1926  Senecal _____ 82—4 X

HARRISON L. HINSON, *Primary Examiner.*